(12) United States Patent
Sazinger

(10) Patent No.: US 12,316,147 B2
(45) Date of Patent: May 27, 2025

(54) METHOD FOR OPERATING AN ELECTRONIC CIRCUIT ARRANGEMENT FOR ELECTRICAL CURRENT LIMITING IN A POTENTIALLY EXPLOSIVE AREA

(71) Applicant: ECOM INSTRUMENTS GMBH, Assamstadt (DE)

(72) Inventor: Manfred Sazinger, Igersheim (DE)

(73) Assignee: ECOM INSTRUMENTS GMBH (DE)

( * ) Notice: Subject to any disclaimer, the term of this patent is extended or adjusted under 35 U.S.C. 154(b) by 566 days.

(21) Appl. No.: 17/489,695

(22) Filed: Sep. 29, 2021

(65) Prior Publication Data

US 2022/0021225 A1    Jan. 20, 2022

Related U.S. Application Data

(63) Continuation of application No. PCT/EP2020/058922, filed on Mar. 30, 2020.

(30) Foreign Application Priority Data

Mar. 29, 2019    (DE) .................... 10 2019 108 302.8

(51) Int. Cl.
*H02J 7/00* (2006.01)
*H01M 10/42* (2006.01)
*H02H 7/18* (2006.01)

(52) U.S. Cl.
CPC ......... *H02J 7/0031* (2013.01); *H01M 10/425* (2013.01); *H02H 7/18* (2013.01); *H01M 2010/4271* (2013.01)

(58) Field of Classification Search
CPC ........ H02J 7/0031; H02J 7/18; H01M 10/425; H01M 2010/4271

(Continued)

(56) References Cited

U.S. PATENT DOCUMENTS

| 4,835,649 A | 5/1989 | Salerno |
| 4,851,954 A | 7/1989 | Suerig |

(Continued)

FOREIGN PATENT DOCUMENTS

| DE | 3734886 C1 | 4/1989 |
| DE | 102006029190 A1 | 4/2007 |

(Continued)

OTHER PUBLICATIONS

International Preliminary Report on Patentability dated Oct. 14, 2021 of International application PCT/EP2020/058922 on which this application is based.

(Continued)

*Primary Examiner* — Nathaniel R Pelton
(74) *Attorney, Agent, or Firm* — Barnes & Thornburg LLP

(57) ABSTRACT

A method for operating an electronic circuit arrangement is provided for electrical current limiting in a potentially explosive area, which comprises at least one electrical consumer which is supplied with electrical energy via an electrical supply line from an electrical voltage source, typically from a rechargeable battery which provides an electrical supply voltage, according to which at least one of at least two semiconductor switches present in the electrical supply line is switched into an open state so that the electrical supply line is interrupted when the total electrical voltage present at the semiconductor switches exceeds a predefined voltage threshold value, and according to which the at least one semiconductor switch is switched from the open into the closed state again when an external electrical voltage is applied to the electrical consumer.

25 Claims, 2 Drawing Sheets

(58) Field of Classification Search
USPC .......................................................... 320/134
See application file for complete search history.

(56) References Cited

U.S. PATENT DOCUMENTS

| | | | |
|---|---|---|---|
| 8,422,183 B2 | 4/2013 | Ohshima | |
| 8,593,838 B2 | 11/2013 | Poremba et al. | |
| 9,985,427 B2 | 5/2018 | Sack | |
| 2006/0156109 A1* | 7/2006 | Kojima | G01R 31/006 714/724 |
| 2010/0052619 A1* | 3/2010 | Bishop | H02J 7/0031 320/136 |
| 2015/0092310 A1* | 4/2015 | Sack | H02J 7/0036 361/71 |
| 2016/0322834 A1* | 11/2016 | Carpenter, Jr. | H02J 7/00712 |
| 2017/0025844 A1* | 1/2017 | Creech | H02H 3/093 |
| 2022/0077705 A1* | 3/2022 | Takahashi | B60L 58/15 |

FOREIGN PATENT DOCUMENTS

| | | |
|---|---|---|
| DE | 102010033954 A1 | 2/2012 |
| DE | 102011121850 A1 | 9/2012 |
| DE | 102013219947 A1 | 4/2015 |
| DE | 102013219950 B4 | 12/2018 |

OTHER PUBLICATIONS

International Search Report dated Jun. 9, 2020 of international application PCT/EP2020/058922 on which this application is based.

* cited by examiner

METHOD FOR OPERATING AN ELECTRONIC CIRCUIT ARRANGEMENT FOR ELECTRICAL CURRENT LIMITING IN A POTENTIALLY EXPLOSIVE AREA

CROSS REFERENCE TO RELATED APPLICATIONS

This application is a continuation application of international patent application PCT/EP2020/058922, filed Mar. 30, 2020, designating the United States and claiming priority to German application 10 2019 108 302.8, filed Mar. 29, 2019, and the entire content of both applications is incorporated herein by reference.

TECHNICAL FIELD

The present disclosure relates to a method for operating an electronic circuit arrangement for electrical current limiting in a potentially explosive area. The disclosure further relates to such an electronic circuit arrangement.

BACKGROUND

For using portable electronic devices in a potentially explosive area such as, for example, a drilling rig, there exist electronic circuits with so-called electronic protective circuits which, in the event of a functional disturbance, for example in the manner of an electrical short circuit, interrupt the electrical connection between a rechargeable battery, which supplies the electronic device with electrical energy, and the electronic device as an electrical consumer. For this purpose, a switching element, for example, in the form of a semiconductor switch can be provided in the circuit arrangement, which can be switched into a closed state in which it interrupts the electrical connection between battery and electronic device.

SUMMARY

It is an object of the disclosure to provide new ways in the development of electronic protective circuits, in particular for use in a potentially explosive area.

This object is achieved by a method for operating an electronic circuit arrangement for electrical current limiting, in particular in a potentially explosive area, and an electronic circuit arrangement for electrical current limiting in a potentially explosive area, as described herein.

A first basic idea of the disclosure consists in designing an electronic circuit arrangement for electrical current limiting or an operating method for this circuit arrangement so that the electrical current limiting for the electrical current flowing through an electrical supply line is not only activated upon exceeding a threshold value by interruption of the electrical supply line but is also maintained in the sense of a self-holding function when said threshold value is fallen below again as a result of the interruption that has been accomplished. In this way, an exceeding of a specific current threshold value is effectively and permanently prevented. In the method according to the disclosure proposed here, the interruption of the electrical supply line has the result that an electrical consumer connected to the electrical supply line no longer remains interrupted with electrical energy from an electrical voltage source also connected to the supply line until an electrical voltage is applied to the electrical consumer which brings about a "resetting" of the open semiconductor switch. The interruption of the electrical supply line is accomplished in this case with at least two semiconductor switches arranged in the supply line. The use of two semiconductor switches creates the necessary redundancy in order to be able to use the circuit arrangement in potentially explosive areas.

A second basic idea relates to the protection of safety-relevant components in potentially explosive areas. Thus, the relevant so-called "Ex-Norm" for potentially explosive areas requires that electronic components such as semiconductor switches on which the intrinsic safety depends may only be loaded in safe operation up to two thirds of their maximum permissible barrier layer temperature. In the present case, this relates to at least two semiconductor switches, typically three semiconductor switches. Here use is made of the circumstance that a turned-on semiconductor switch only has a very low electrical voltage drop and thus even with a high electrical current experiences only a little heating power. In the method according to the disclosure, a possible heating power is detected at this voltage drop as the sum of two or even three semiconductor switches. In response to this, the electrical current flow is interrupted and therefore a possible heating of the semiconductor switch is already prevented before its formation. The use of temperature sensors to detect possible overheating of the semiconductor switch and initiate countermeasures after detection is therefore unnecessary.

The method according to the disclosure presented here is used to operate an electronic circuit arrangement for electrical current limiting in a potentially explosive area. The circuit arrangement comprises at least one electrical consumer which is supplied with electrical energy via an electrical supply line from an electrical voltage source, in particular from a rechargeable electric battery. This consumer can comprise an electronic device. According to this method, in particular with at least one comparator circuit provided in the circuit arrangement, at least one of at least two semiconductor switches present in the supply line is switched into an open state when the total electrical voltage present at the semiconductor switches exceeds a predefined voltage threshold value. In this way, the electrical supply line is electrically interrupted.

According to an aspect of the disclosure, the at least one open semiconductor switch is switched from the open into the closed state as soon as an external electrical voltage is applied to the electrical consumer.

Typically, the electrical voltage applied to the at least one electrical consumer is larger than the electrical supply voltage provided by the electrical voltage source.

Typically, this voltage is applied to this electrically in parallel to the at least one consumer.

In the present case, "open state" is understood in particular as an off state of the respective semiconductor switch, closed state is understood in each case as an "on-state".

Optionally the open state of the at least one semiconductor switch can be maintained after falling below the voltage threshold value until the comparator circuit is reset.

According to an exemplary embodiment, the switchover of the at least one semiconductor switch between the open and the closed state is accomplished with a comparator circuit cooperating with the semiconductor switch. In this case, a self-holding function is implemented so that the semiconductor switch is not switched back into the closed state again immediately after switching over into the open state as a result of the accompanying electrical interruption in the supply line.

Expediently it is detected by the at least one comparator circuit when the external electrical voltage is applied to the electrical consumer and if this occurs, the comparator circuit generates an electrical output signal which brings about a switching of the semiconductor switch from the open state into the closed state.

According to an advantageous further development, a first electrical input voltage which depends on the total of the electrical voltage present at the at least one electrical consumer and the total electrical voltage present at the semiconductor switches is provided at a first comparator input connection of the comparator circuit. Likewise in this further development a second electrical input voltage which depends on the electrical voltage present at the at least one electrical consumer is provided at a second comparator input connection of the comparator circuit. Furthermore, in this further development, depending on the electrical voltages provided at the two comparator input connections an electrical output signal for controlling and optionally for switching the semiconductor switch is generated at an output connection of the comparator circuit.

According to another exemplary embodiment, the aforementioned electrical voltage is applied or provided to the at least one electrical consumer by connecting an electrical charging device. With the electrical charging device, the electrical voltage supply or the rechargeable battery can be electrically charged. Expediently by suitably configuring the electronic circuit arrangement, the resetting of the comparator circuit can therefore also be triggered by connecting an electrical charging device for recharging the rechargeable electric battery.

According to an exemplary embodiment, the at least one semiconductor switch located in the open state is switched into a closed state by resetting the comparator circuit, in which state the interruption of the electrical supply line by this semiconductor switch is cancelled. Particularly typically all the comparator circuits provided are reset in this way so that the electrical consumer can be supplied with electrical energy again via the electrical supply line.

According to a particularly exemplary embodiment of the method, it is proposed that the switching of the at least one semiconductor switch between the open and the closed state is accomplished with a logic unit. This logic unit generates an output signal through an "or link" or through an "and link" of two signal inputs with which the semiconductor switch is triggered, wherein a first input signal generated at the first signal input is generated by the comparator circuit. Said logic unit enables the assigned semiconductor switch to be triggered not only by the relevant semiconductor switch but independently thereof by an additional electrical voltage monitoring which is explained in detail hereinafter. The "or link" or "and link" implemented in the logic unit therefore ensures that the semiconductor switch can be switched both with the comparator circuit already described and also with the electrical voltage monitoring explained hereinafter. In the logic unit the "or link" is used to switch the semiconductor switch from the closed into the open state. The "and link" is used to hold the semiconductor switch in the open state.

According to an advantageous further development, the electrical current flowing through the electrical supply line is monitored with an additional electrical voltage monitoring. This additional electrical voltage monitoring switches at least one of the at least two semiconductor switches present in the supply line into its open state when the electrical current flowing through the electrical supply line exceeds a predetermined threshold value. In this way, the electrical current flow through the electrical supply line can be additionally and independently ensured for monitoring with the comparator circuits. The electrical voltage monitoring can be formed by an integrated circuit (IC) which measures the electrical voltage present at an Ohmic resistance arranged in the supply line for determining the electric current flowing through the supply line.

Expediently the electrical voltage monitoring for switching the semiconductor switch into the open state when the current threshold value is exceeded generates a corresponding control signal at the second signal input of the logic unit. This control signal is configured in such a manner that it is relayed to the control input of the semiconductor switch with the "or link" implemented in the logic unit. In this way, the required triggering of the relevant semiconductor switch by the electrical current limiting is possible and specifically independently of the comparator circuit controlling the second signal input. Particularly typically the electrical current limiting can trigger the at least two, typically all the semiconductor switches present in the electrical supply line. For this purpose, the electrical current monitoring is connected electrically to the logic units assigned to these semiconductor switches, i.e., to their respective second signal input.

Expediently, the semiconductor switch switched into the open state by corresponding triggering of at least one comparator circuit is held in the open state after the electrical current flowing through the electrical supply line has fallen below the current threshold value again. In this way, a renewed opening of the semiconductor switch as a result of the still present error state can be avoided. In particular, a continuous switching of the semiconductor switch to and from between the open and the closed state is avoided.

The disclosure further relates to an electronic circuit arrangement for electrical current limiting in a potentially explosive area. The circuit arrangement is in particular configured for carrying out the method explained hereinbefore so that the previously explained advantages of the method are also transferred to the circuit arrangement.

The circuit arrangement according to the disclosure comprises at least one electrical consumer which can be supplied with electrical energy from an electrical voltage source, typically a rechargeable battery with an electrical supply line. The circuit arrangement further comprises a first semiconductor switch and at least one second semiconductor switch which are arranged in the electrical supply line in such a manner that by switching at least one semiconductor switch into an open state, the electrical supply line is electrically interrupted. In such an interrupted state no electrical energy can be transported via the electrical supply line from the electrical voltage source to the at least one electrical consumer. Furthermore, the circuit arrangement comprises an electrical supply connection to which the electrical voltage source, typically the rechargeable battery, can be connected or is connected, in particular for carrying out the method explained above. In this case, the at least two semiconductor switches are arranged between the electrical supply connection and the electrical consumer. According to the disclosure, the circuit arrangement comprises a comparator circuit, typically two such comparator circuits, which are expediently constructed identically. The at least one comparator circuit is configured in such a manner that it switches at least one semiconductor switch into an open state so that the electrical supply line is interrupted when the total electrical voltage present at the semiconductor switches exceeds a predefined voltage threshold value. Furthermore, the at least one comparator circuit is configured in such a manner that it switches the at least one semiconductor switch (again) from the open into the closed state again when an external electrical voltage is applied to the electrical consumer which is typically larger than the electrical supply voltage provided by the electrical voltage source.

According to an advantageous further development, a separate comparator circuit and a logic unit assigned to this comparator circuit and this semiconductor switch are provided for each semiconductor switch. Such a redundancy increases the operating safety of the circuit arrangement which can be necessary as a result of legal provisions when the circuit arrangements is to be used for current limiting in a potentially explosive area.

According to an exemplary embodiment, switching the at least one semiconductor switch between the open and the closed state is accomplished with a logic unit which generates an output signal through an "or link" or through an "and link" of at least two signal inputs. With this output signal the relevant semiconductor switch is triggered. In this embodiment to generate the first electrical input signal the first signal input of the logic unit is connected electrically to a comparator output of the comparator circuit. Said logic unit enables the assigned semiconductor switch to be triggered not only by the relevant semiconductor switch but independently thereof by the already explained additional electrical current limiting. The "or link" implemented in the logic unit ensures that the semiconductor switch can be switched both with the comparator circuit already described and also with the additional electrical voltage monitoring. In addition, the "or" link implemented in the logic circuit ensures that after switching into the open state the semiconductor switch remains in this state even when the electric current through the electrical supply line has fallen below the critical threshold value again as a result of the open semiconductor switch.

According to an advantageous further development of the circuit arrangement, the additional electrical voltage monitoring already explained in connection with the method according to the disclosure is arranged in the electrical supply line. Said electrical voltage monitoring is configured in such a manner that it switches at least one of the at least two semiconductor switches into the open state when the electrical current flowing through the electrical supply line exceeds a predetermined current threshold value. In this way, the electrical current can be ensured independently of the correct functioning mode of the comparator circuits. The electrical voltage monitoring can be formed by an integrated circuit (IC) which measures the electrical voltage present at an Ohmic resistance arranged in the supply line to determine the electrical current flowing through the supply line.

Expediently the electrical voltage monitoring for switching the semiconductor switch into the open state when the current threshold value is exceeded at the second signal input of the logic unit and for generating the second input signal is connected electrically to the second signal input of the logic unit.

According to another exemplary embodiment, the comparator circuit comprises a comparator output connection as well as a first and a second comparator input connection. In addition, according to this exemplary embodiment during operation of the comparator circuit a suitable comparator output signal is generated at the comparator output connection depending on a comparison between the first and/or second comparator input signal present at the first and second comparator input connection.

Typically, the at least one comparator circuit comprises an operational amplifier or is formed by an operational amplifier which comprises the two comparator input connections and the comparator output connection. Thus, commercially available electronic components can be used for the technical implementation of the comparator circuits.

According to an advantageous further development, the first comparator input connection is connected electrically, typically via a first electrical voltage divider, to a first branch-off point. This first branch-off point is arranged in the electrical supply line between the electrical supply connection and the at least two semiconductor switches. Similarly in this further development the second comparator input connection is connected electrically, typically via a second electrical voltage divider to a second branch-off point. This second branch-off point is arranged in the electrical supply line between the at least two semiconductor switches and the at least one electrical consumer.

According to a further advantageous further development, in the electronic circuit arrangement for each of the semiconductor switches provided in this supply line for interrupting the electrical supply line, respectively one logic unit for controlling this semiconductor switch and a comparator circuit for controlling the respective logic unit is provided.

Expediently the comparator output connection of at least one comparator circuit for triggering at least two different semiconductor switches arranged in the electrical supply line is connected electrically to the signal inputs of at least two different logic units for triggering the semiconductor switches of the logic units provided.

Typically, this can also apply to all the comparator circuits present in the circuit arrangement.

According to an advantageous further development, the first and/or the second voltage divider comprises at least one Ohmic electrical resistance which can be configured as an NTC or PTC resistance.

Further important features and advantages of the disclosure are obtained from the drawings and from the relevant description of the figures with the drawings.

It is understood that the aforesaid features and those to be explained hereinafter can be used in the respectively given combination but also in other combinations or alone without departing from the scope of the present disclosure.

BRIEF DESCRIPTION OF THE DRAWINGS

The disclosure will now be described with reference to the drawings wherein.

DESCRIPTION OF EXEMPLARY EMBODIMENTS

Figure 1:
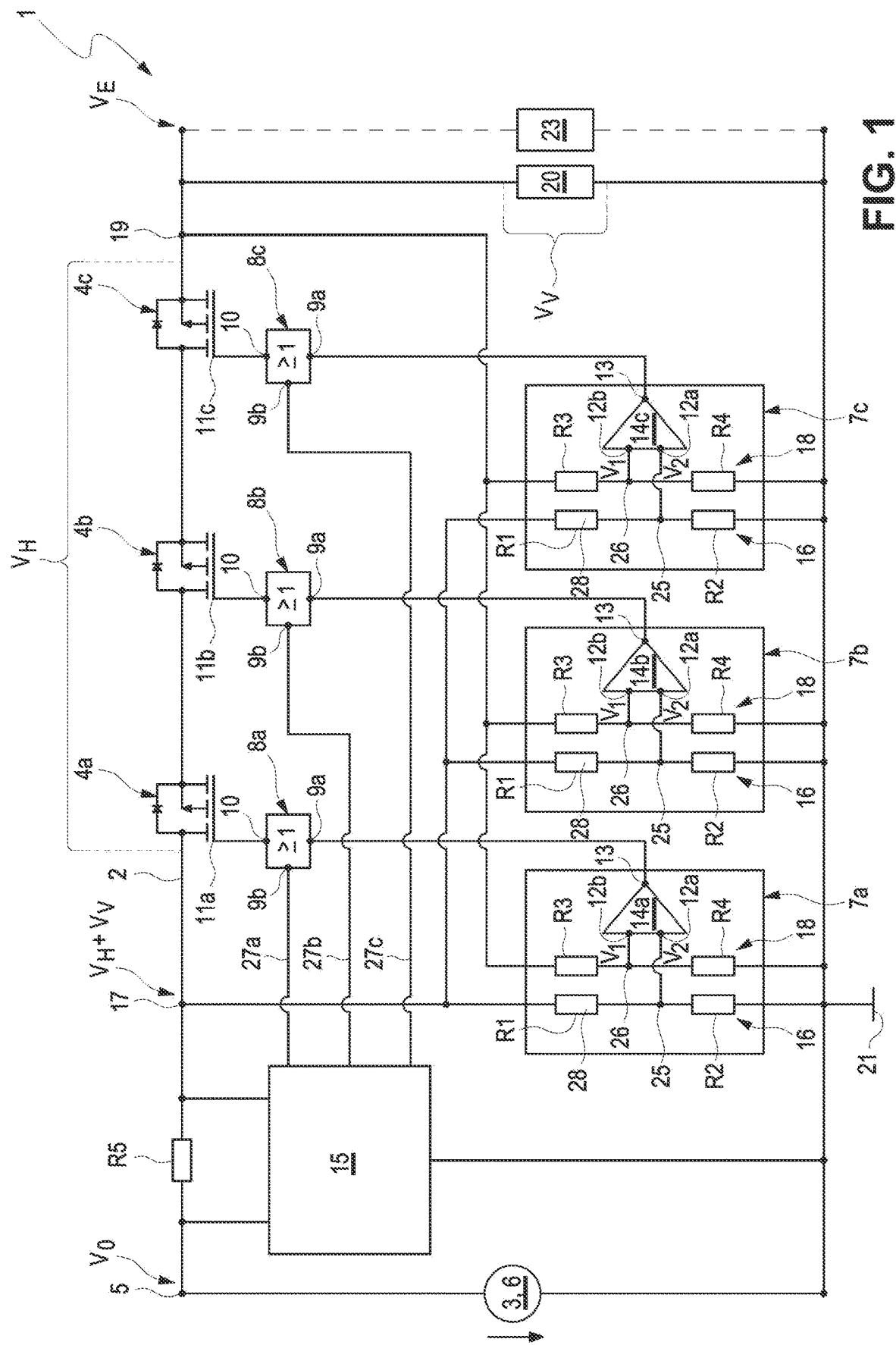
FIG. 1 shows a circuit arrangement for carrying out a method according to an exemplary embodiment of the disclosure.

FIG. 1 illustrates an electronic circuit arrangement 1 according to an exemplary embodiment of the disclosure which is configured for use in a potentially explosive area and for carrying out the method according to the exemplary embodiment of the disclosure. The electronic circuit arrangement 1 comprises an electrical consumer 20 indicated only highly schematically in FIG. 1 which can be supplied with electrical energy with an electrical supply line 2 from an electrical voltage source 3 in the form of a rechargeable battery 6. For this purpose, the electrical voltage source 3 or the rechargeable battery 6 is also connected electrically to the electrical supply line 2. During operation the electrical voltage source 3 or the battery 6 provides an electrical supply voltage V0.

In the exemplary embodiment shown in FIG. 1, the electronic circuit arrangement 1 comprises a first semiconductor switch 4a, a second semiconductor switch 4b and a third semiconductor switch 4c. The three semiconductor switches 4a, 4b, and 4c are arranged in such a manner in the electrical supply line 2 that by switching at least one of the three semiconductor switches 4a, 4b, and 4c into a respective open state, the electrical supply line 2 is electrically interrupted. Typically, the three semiconductor switches 4a, 4b, and 4c are connected electrically to one another in series. In said state no electrical energy can be transported via the electrical supply line 2 from the electrical voltage source 3 to the electrical consumer 20. According to FIG. 1, an electrical supply connection 5 is provided at the electrical supply line 2 to which the electrical voltage source 3 or the rechargeable battery 6 can be connected. The three semiconductor switches 4a-4c connected electrically in series with one another are arranged between the electrical supply connection 5 and the electrical consumer 20.

Furthermore, the electronic circuit arrangement 1 comprises three comparator circuits 7a, 7b, 7c wherein each semiconductor switch 4a, 4b, 4c is assigned respectively one comparator circuit 7a, 7b, 7c. In the following, the operating mode of the three comparator circuits 7a, 7b, 7c is explained by reference to the comparator circuit 7a which is assigned to the first semiconductor switch 4a. The operating mode of the two comparator units 7b, 7c is identical to the comparator circuit 7a semiconductor switch.

The comparator circuit 7a can switch the semiconductor switch 4a into an open state so that the electrical supply line 2 is electrically interrupted when the total electrical voltage present at the three semiconductor switches 4a, 4b, 4c semiconductor switches 4a, 4b, 4c exceeds a predefined voltage threshold value VS. In addition, the comparator circuit 7a can switch the semiconductor switch 4a again from the open into the closed state when an external electrical voltage VE is applied to the electrical consumer 20 which in the example scenario is larger than the electrical supply voltage V0 provided by the external voltage source 3. Said external electrical voltage VE can in particular be provided by connecting an electrical charging device 23 to the electrical consumer 20. The charging device 23 is used for electrical charging of the battery 6.

The comparator circuit 7a therefore detects whether the total electrical voltage VH present at the three semiconductor switches 4a, 4b, 4c exceeds a predefined voltage threshold value VS. As soon as this case occurs, the comparator circuit 7a generates an electrical output signal in the form of an electrical output voltage, which brings about a switching of the semiconductor switch 4a from the closed state into the open state so that the electrical supply line 2 is electrically interrupted. With the aid of the comparator circuit 7a a self-holding function is implemented in this case so that after switching into the open state as a result of the accompanying electrical interruption in the electrical supply line 2, the semiconductor switch 4a is not switched back into the closed state again immediately. In this way, an undesired "triggering" of the semiconductor switch 4a, i.e., a repeated switching of the semiconductor switch 4a many times between the open and the closed state is avoided.

For switching the semiconductor switch 4a from the open into the closed state, i.e., for "resetting" the circuit arrangement 1, the comparator circuit 7a can detect whether the said external electrical voltage VE has been applied to the electrical consumer 20. As soon as this is detected, the comparator circuit 7a generates an electrical output signal in the form of an electrical output voltage which brings about a switching of the semiconductor switch 4a from the open state into the closed state.

The circuit arrangement 1 is configured in this case so that a first electrical input voltage V1 which depends on the total of the electrical voltage VV present at the electrical consumer 20 and the total electrical voltage VH present at the semiconductor switches 4a, 4b, 4c is provided at the first comparator input connection 12a of the comparator circuit 7a. A second electrical input voltage V2 which depends on the electrical voltage present at the electronic consumer 20 is provided at the second comparator input connection 12b of the comparator circuit 7a. Depending on the electrical voltages V1, V2 provided at the two comparator input connections 12a, 12b, a specific output signal, in the form of an electrical output voltage, is generated at the comparator output connection 13 of the comparator circuit 7a, which optionally brings about a switching of the semiconductor switch 4a between the open and the closed state.

As can be seen in FIG. 1, a separate logic unit 8a, 8b, 8c is provided for each comparator circuit 7a, 7b, 7c and thus for each semiconductor switch 4a, 4b, 4c. Structure and operating mode of the logic unit 8a are explained in more detail hereinafter. The two logic units 8b, 8c are constructed identically to the logic unit 8a so that their operating mode is identical to the operating mode of the logic unit 8a.

The logic unit 8a has a first and a second signal input 9a, 9b and a signal output 10. The signal output 10 is linked via a logical "or" link to the two signal inputs 9a, 9b. A control input 11a of the first semiconductor switch 4a with which the first semiconductor switch 4a can be switched between the open and the closed state is triggered via an output signal generated at the signal output 10 of the logic unit 8a.

As FIG. 1 illustrates, for this purpose the first signal input of the logic unit 8a is connected electrically to a comparator output connection 13 of the comparator circuit 7a. In addition, according to FIG. 1 an electrical voltage monitoring 15 is arranged in the electrical supply line 2 between the supply connection 5 and the three semiconductor switches 4a, 4b, 4c. The electrical voltage monitoring 15 switches the three semiconductor switches 4a, 4b, 4c into their open state in each case when the electric current 1 flowing through the electrical supply line 2 exceeds a predetermined current threshold value 1S. For switching the three semiconductor switches 4a, 4b, 4c into the open state when exceeding the current threshold value IS, the electrical voltage monitoring 15 is connected to the second signal inputs 9b of the logic units 8a, 8b, 8c.

As can be further seen from FIG. 1, the first comparator circuit 7a also comprises in addition to the comparator output connection 13 a first and a second comparator input connection 12a, 12b. Thus, the comparator circuit 7a can generate a comparator output signal at the comparator output connection 13 depending on a comparison of the first or second comparator input signal present at the first and at the second comparator input connection 12a, 12b. The first comparator circuit 7a can be formed by an operational amplifier 14a familiar to the person skilled in the art which has the two comparator input connections 12a, 12b and the comparator output connection 13.

As illustrated by the diagram in FIG. 1, the first comparator input connection 12a is connected via a first electrical voltage divider 16 to a first branch-off point 17 which is arranged in the electrical supply line 2 between the electrical supply connection 5 and the three semiconductor switches 4a, 4b, 4c. The first voltage divider 16 comprises a first electrical resistance R1 and a second electrical resistance R2 connected electrically in series with this. The electrical supply line 2 is connected via the first voltage divider 16 comprising the two resistances R1 and R2 to the electrical earth potential 21. A branch-off point 25 is provided between the two electrical resistances R1 and R2 which is connected electrically to the first comparator input connection 12a. Furthermore, the second comparator input connection 12b is connected electrically via a second electrical voltage divider 18 to a second branch-off point 19 which is arranged in the electrical supply line 2 between the three semiconductor switches 4a, 4b, 4c and the electrical consumer 20. The second voltage divider 18 comprises a third electrical resistance R3 and a fourth electrical resistance R4 connected electrically in series with this. Expediently the electrical resistances R1, R2, R3, R4 comprise Ohmic resistances. The electrical supply line 2 is also connected electrically via the second voltage divider 18 comprising the two resistances R3 and R4 to the earth potential 21. A branch-off point 26 is provided between the two electrical resistances R3 and R4 which is connected electrically to the second comparator input connection 12b.

As can be additionally seen from FIG. 1, the comparator output connection 13 of the three comparator circuits 7a, 7b, 7c can be connected electrically to the signal inputs 9a, 9b of all three logic units 8a, 8b, 8c for triggering at least two different semiconductor switches 4a, 4b, 4c arranged in the electrical supply line 2 so that each of the three logic units 8a-8c and therefore each of the three comparator circuits 7a-7c can switch all three semiconductor switches 4a-4c into their respective open state.

As can be further identified in FIG. 1, the first electrical resistance R1 of the first electrical voltage divider 16 can be executed as an NTC resistance or as a PTC resistance (not shown).

The method according to the disclosure is explained as an example hereinafter with reference to the circuit diagram of FIG. 1: during operation of the electrical consumer 20 the consumer 20 obtains electrical energy via the electrical supply line 2 from the electrical voltage source 3 in the form of the rechargeable battery 6. Thus, an electric current 1 flows from the voltage source 3 via the electrical supply line 2 and the consumer 20 to the earth potential 21. This electric current is monitored by the electrical voltage monitoring 15. The two electrical voltage dividers 16, 18 comprising the resistances R1, R2, R3, R4 are dimensioned so that the comparator circuit 7a generates an output signal which does not accomplish any switching of the semiconductor switch 4a into the open state by the downstream logic unit 8a. Thus, electric current 1 can still flow through the supply line 2.

However, with the three comparator circuits 7a, 7b, 7c, the three semiconductor switches 4a-4c present in the electrical supply line 2 are switched into an open state so that the electrical supply line 2 is interrupted when the total electrical voltage VH present at the semiconductor switches 4a, 4b, 4c exceeds the predefined voltage threshold value VS. Consequently, an electrical connection no longer exists between the electrical voltage source 3 in the form of the rechargeable battery 6 and the electrical consumer 20, i.e., the electrical energy or voltage supply of the electrical consumer 20 is interrupted. In this state, no electrical voltage is present at the electrical consumer 20. Thus, the second voltage divider 18 comprising the third and the fourth resistance R3, R4 is also currentless. Consequently, the input signal present at the second comparator input connection 12b also varies. The first voltage divider 16 comprising the first and the second resistance R1, R2 is dimensioned in such a manner that as a result of the changed input signal present at the second comparator input connection, the output signal generated by the first comparator circuit 7a also varies. This changed output signal is supplied via the first signal input 9a to the logic unit 8a. As a result of the logical "or" link accomplished there, the control input 11a of the first semiconductor switch 4a is triggered by the first comparator circuit 7a so that the first semiconductor switch 4a remains in the open state even when the electrical voltage monitoring 15 has detected that, as a result of the now-interrupted electrical supply line 2, the current has again dropped below predefined threshold current value IS. A self-holding function is therefore integrated in the comparator circuit 7a which holds the semiconductor switch 4a in the open state.

As the diagram in FIG. 1 illustrates, the first comparator input connection 12a is connected electrically via a first electrical voltage divider 16 to a first branch-off point 17 which is arranged in the electrical supply line 2 between the electrical supply connection 5 and the three semiconductor switches 4a, 4b, 4c. The first voltage divider 16 comprises a first electrical resistance R1 and a second electrical resistance R2 connected electrically in series with this. The electrical supply line 2 is connected via the first voltage divider 16 comprising the two resistances R1 and R2 to an electrical earth potential 21. A branch-off point 25 is provided between the two electrical resistances R1 and R2 which is connected electrically to the first comparator input connection 12a. Furthermore, the second comparator input connection 12b is connected electrically via a second electrical voltage divider 18 to a second branch-off point 19 which is arranged in the electrical supply line 2 between the three semiconductor switches 4a, 4b, 4c and the electrical consumer 20. The second voltage divider 18 comprises a third electrical resistance R3 and a fourth electrical resistance R4 connected electrically in series with this. The electrical supply line 2 is also connected electrically via the second voltage divider 18 comprising the two resistances R3 and R4 to the earth potential 21. A branch-off point 26 is provided between the two electrical resistances R3 and R4 which is connected electrically to the second comparator input circuit 12b. In a nominal operating state, the electrical consumer 20 is supplied with electrical energy from the electrical voltage source 3 or from the rechargeable battery 6. In this nominal operating state, the three semiconductor switches 4a, 4b, 4c are each located in a closed state so that electrical current 1 can flow from the electrical voltage source 3 or rechargeable battery 6 to the electrical consumer 20. The two electrical voltage dividers 16, 18 comprising the electrical resistances R1, R2, R3, R4 are dimensioned in such a manner and matched to one another such that in this nominal operating state, an output signal, typically in the form of an electrical output voltage, is generated at the respective comparator output connection 13 of the three comparator circuits 7a, 7b, 7c, which output signal ensures that the downstream respective logic unit 8a, 8b, 8c generates a control signal at its respective signal output 10, and therefore at the control input 11a, 11b, 11c of the respective semiconductor switch 4a, 4b, 4c connected to the signal output 10, which leaves the relevant semiconductor switch 4a, 4b, 4c in the closed state.

The total electrical voltage V present at the three semiconductor switches 4a, 4b, 4c can be determined via the two branch-off points 17,19 which are electrically connected to the first or second voltage divider 16, 18. The two voltage dividers 16, 18 are dimensioned in this case so that in the nominal operating state the aforesaid output signal is generated by the respective comparator circuits 7a, 7b, 7c in such a manner that the semiconductor switches 4a, 4b, 4c are not switched into the open state so that the electrical consumer 20 can be supplied with electrical energy. If the electrical voltage V present at the three semiconductor switches 4a-4c, i.e., the electrical potential difference between the two branch-off points 17, 19 exceeds a predetermined voltage threshold value V, this has the result that the electrical voltage present at the first and second comparator input connection 12a, 12b of each comparator circuit 7a-7c varies so that a signal variation in the form of a changed output voltage—voltage variation occurs. This means that a voltage signal is generated by the comparator output 13 which is processed by the respectively downstream logic unit 8a, 8b, 8c in such a manner that the downstream semiconductor switches 4a, 4b, 4c assigned to the respective logic unit 8a, 8b, 8c is switched into the open state. This in turn has the effect that the electrical supply line 2 is electrically interrupted. Thus, electric current I can no longer flow from the electrical voltage source 3 or from the rechargeable battery 6 to the electrical consumer 20. The desired electrical current limiting is ensured in this way. In this case, the electrical power received by at least one of the semiconductor switches 4a, 4b, 4c should be limited.

As a result of the electrical interruption of the electrical supply line 2, electrical voltage can no longer be present between the second branch-off point 19 and the earth potential 21. Thus, it follows that the second voltage divider 18 comprising the electrical resistances R3 and R4 is currentless. This brings about a switching of the respective comparator circuit 7a, 7b, 7c, i.e. the output signal now generated by the comparator circuit 7a, 7b, 7c which is supplied to the downstream logic unit 8a, 8b, 8c is configured in such a manner than the relevant logic unit 8a, 8b, 8c for generating a corresponding output signal at the signal output 10 and thus at the control input 11a, 11b, 11c of the respective semiconductor switch 4a, 4b, 4c ensures that the relevant semiconductor switch 4a, 4b, 4c remains in the open state in each case. In this way, an undesired switching of the semiconductor switch 4a, 4b, 4c back into the closed state is prevented after the electric current flowing through the supply line 2 as a result of opening the semiconductor switches 4a, 4b, 4c again falls below the previously exceeded current threshold value IS. With the three comparator circuits 7a, 7b, 7c a self-holding function is therefore integrated in the circuit arrangement 1. Only a connection of an electrical charging device 23 for charging the battery 6—connected in parallel to the electrical consumer 20, i.e., between the second branch-off point 19 and the earth potential 21, ensures that the second branch-off point 19 is again set to an electrical potential which differs from the earth potential 21. In consequence, the second voltage divider 18 comprising the electrical resistances R3, R4 is no longer currentless so that the comparator circuits 7a, 7b, 7c go over into their respective initial state. Thus, the nominal operating state of the circuit arrangement 1 is restored in which the semiconductor switches 4a, 4b, 4c are each located in their closed state so that electric current l can again flow through the electrical supply line 2 electrical supply line 2 from the electrical voltage source 3 or the rechargeable battery 6 to the electrical consumer 20.

With said connection of an external electrical charging device 23 to the electronic circuit arrangement electronic circuit arrangement 1, i.e., to the second branch-off point 19 and to the earth potential 21 and therefore to the electrical consumer 20, the three comparator circuits 7a, 7b, 7c of the electronic circuit arrangement 1 are reset. As long as the electrical charging device 23 remains connected, the rechargeable battery 6 is charged. After separating the external charging device 23 from the electronic circuit arrangement 1, the semiconductor switches 4a, 4b, 4c each remain in their closed state. Thus, the original nominal operating state is restored in the circuit arrangement 1.

In addition to the current monitoring by the three comparator circuits 7a, 7b, 7c, current l flowing through the electrical supply line 2 can also be monitored with an additional electrical voltage monitoring 15 which can be configured in the form of an integrated circuit (IC).

The electrical voltage monitoring 15 monitors the electrical voltage V0 present at the Ohmic resistance R5 arranged in the electrical supply line 2. In this way, the electric current flowing through the electrical supply line 2 can be determined. As soon as the electric current flowing through the electrical supply line 2 exceeds a predetermined current threshold value IS, the electrical power supply 15 generates a control signal, possibly in the form of an electrical voltage pulse, for switching the semiconductor switches 4a, 4b, 4c into the open state which is provided via electrical connecting lines 27a, 27b, 27c between the electrical voltage monitoring 15 and the second signal inputs 9b of the three logic units 8a, 8b, 8c at these second signal inputs 9b. In the logic units 8a, 8b, 8c the "or link" is used for switching the semiconductor switch from the closed into the open state. The "and link" is used to hold the semiconductor switch in the open state. As a result of the "or" links and the "and" links of the input signals present at the respective first and second signal inputs 9a, 9b taking place in the logic unit 8a, 8b, 8c, the control signal present at the respective second signal input 9b of the logic units 8a, 8b, 8c is output as an output signal at the respective signal output 10 of the relevant logic units 8a, 8b, 8c which then switches the three semiconductor switches 4a, 4b, 4c into the open state and triggers the already mentioned self-holding function.

The interruption of the electrical current flow through the supply line 2 with the electrical voltage monitoring 15 ensures that electrical voltage V can no longer be present between the second branch-off point 19 and the earth potential 21. Thus, as has already been explained previously, it follows that the second voltage divider 18 comprising the electrical resistances R3 and R4 is currentless.

This is therefore accompanied by said switching of the three comparator circuits 7a, 7b, 7c, i.e. the output signal now generated by the comparator circuit 7a, 7b, 7c, which is supplied to the downstream logic unit 8a, 8b, 8c, has the result that the relevant logic unit 8a, 8b, 8c for generating a corresponding output signal at the signal output 10 and therefore at the control input 11a, 11b, 11c of the respective semiconductor switch 4a, 4b, 4c ensures that the relevant semiconductor switch 4a, 4b, 4c remains in the open state in each case. The already described self-holding function of the three comparator circuits 7a, 7b, 7c is therefore also effective when the semiconductor switches 4a, 4b, 4c are switched into the open state with the electrical voltage monitoring 15. In this case also the undesired switching of the semiconductor switches 4a, 4b, 4c back into the closed state is therefore prevented after the electric current l flowing through the supply line 2 and therefore detected by the electrical current limiting as a result of the opening of the semiconductor switches 4a, 4b, 4c falls below the previously exceeded current threshold value IS again and thus deactivates the electrical voltage monitoring 15. The resetting of the comparator circuits 7a, 7b, 7c is accomplished as already explained by connecting the electrical charging device 23.

Figure 2:
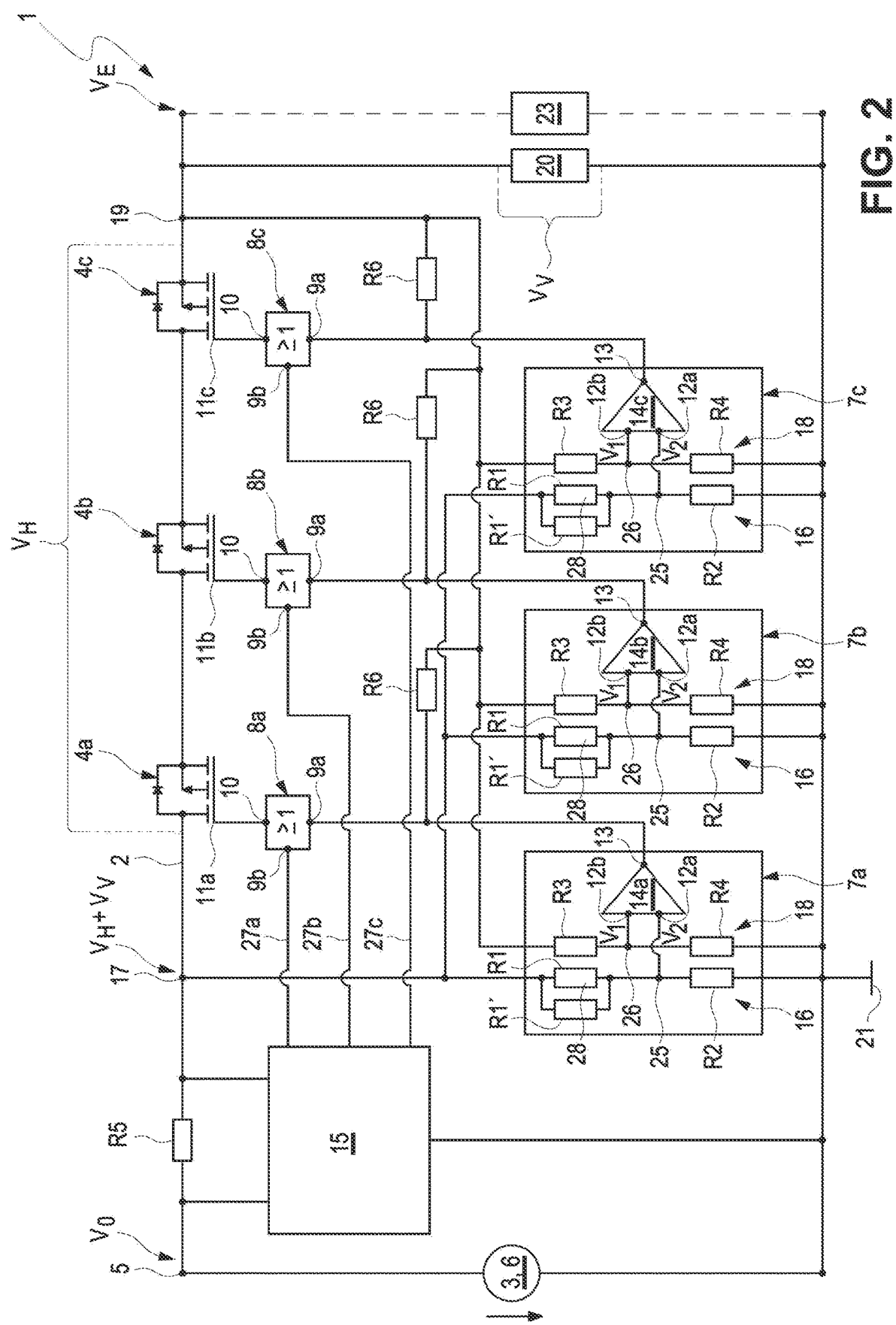
FIG. 2 shows a further development of the exemplary embodiment of FIG. 1.

FIG. 2 shows a further development of the circuit arrangement 1 of FIG. 1. In the following only the differences between the circuit arrangement of FIG. 1 and that of FIG. 2 are explained. In the example of FIG. 2, an additional Ohmic resistance R1' is connected in parallel with the electrical resistance R1. Since the resistance R1 configured as temperature sensor 28 can have a very high resistance at low temperatures, the resistance R1' connected in parallel to R1 limits the electrical total resistance of R1 and R1' to a maximum resistance value. In this way, a minimum voltage drop can be ensured at the resistance R2 connected in series with R1/R1'. This in turn results in an improved self-holding function of the relevant comparator circuit 7a, 7b, 7c.

Alternatively or additionally to the additional Ohmic resistance R1', in the circuit arrangement 1 according to FIG. 2, an additional electrical resistance R6 in the form of an Ohmic resistance can be provided which connects the respective comparator output 13 of the comparator circuit 7a, 7b, 7c electrically to the second branch-off point 19. The resistance R6 prevents an undesired electric current between the two branch-off points 17, 19 which could reduce the self-holding function of the relevant comparator circuit 7a, 7b, 7c. With the electrical resistance R6 the self-holding function of the comparator circuit 7a, 7b, 7c is therefore improved. In this way the functional capability of the three comparator circuits 7a, 7b, 7c can be ensured independently of one another. This applies in particular for an assumed case of error in which the two comparator input connections 12a, 12b of a comparator circuit 7a, 7b, 7c would be internally connected in a low-resistance manner. This would have the result that from the branch-off point 17 via the electrical resistance R1, via said low-resistance connection and via the electrical resistance R3, an electric current flows to the branch-off point 19, raises the voltage level there and thus "removes" the two still-functioning self-holding circuits. Thus, from the explosion viewpoint the three circuits are no longer functionally independent of one another, i.e., a single error could simultaneously put all three comparator circuits 7a, 7b, 7c out of action. With the electrical resistance R6 as load, the respective open drain output of each comparator circuit 7a, 7b, 7c is able to "pull so far down" the electrical voltage at the branch-off point 19 when the semiconductor switch 4a, 4b, 4c is open in any case and independently of the electrical consumer 10 that the self-holding of the two still-functioning comparator circuits 7a, 7b, 7c is maintained. The electrical resistance R6 therefore serves to ensure, even when considering error cases such as are required for protection from explosions, that the three comparator circuits 7a, 7b, 7c always operate independently of one another.

A temperature sensor 28 can be electrically connected to the comparator circuit 7a on the input side, with which the temperature of a component (not shown) connected thermally to the temperature sensor 28—this can in particular be an electrical/electronic component. The comparator circuit 7a and the temperature sensor 28 are configured in such a manner and matched to one another such that, when the temperature determined with the temperature sensor 28 exceeds a predetermined threshold temperature TS, an electrical output signal provided at the comparator output 13, in the form of an electrical output voltage, is generated by the comparator circuit 7a which brings about a switching of the semiconductor switch 4a from the closed state into the open state so that the electrical supply line 2 is interrupted. In this way, the comparator circuit 7a can be used to interrupt the electrical supply line 2 even when other components (not shown in the figures) overheat which are temperature-monitored with the temperature sensor 28.

In FIG. 1 purely as an example, said temperature sensor 28 is formed by the electrical resistance R1 which is configured for this purpose as an electrical NTC resistance and as shown in FIG. 1, is connected electrically to the first comparator input connection 12a. If a PTC resistance should be used, in the example the electrical resistance R3 should be configured as such a temperature sensor 28.

It is understood that the foregoing description is that of the exemplary embodiments of the disclosure and that various changes and modifications may be made thereto without departing from the spirit and scope of the disclosure as defined in the appended claims.

What is claimed is:

1. A method for operating an electronic circuit arrangement for electrical current limiting in a potentially explosive area, the electronic circuit arrangement including at least one electrical consumer, which is supplied with electrical energy via an electrical supply line from an electrical battery which provides an electrical supply voltage, the method comprising:

switching at least one of at least two semiconductor switches present in the electrical supply line from a closed state to an open state such that the electrical supply line is interrupted in response to the total electrical voltage present at the semiconductor switches exceeding a predefined voltage threshold value; and switching the at least one semiconductor switch from the open to the closed state only in response to an external electrical voltage being applied to the at least one electrical consumer, wherein the external electrical voltage applied to the at least one electrical consumer is larger than the electrical supply voltage provided by the electrical voltage source, and wherein:

a first electrical input voltage, which depends on a sum of an electrical voltage present at the at least one electrical consumer and an electrical voltage present at the semiconductor switches, is provided at a first comparator input connection of at least one comparator circuit;

a second electrical input voltage, which depends on the electrical voltage present at the at least one electrical consumer, is provided at a second comparator input connection of the at least one comparator circuit; and depending on the electrical voltages provided at the first and second comparator input connections, an electrical output signal for controlling and optionally switching the semiconductor switch is generated at a comparator output connection of the at least one comparator circuit.

2. The method according to claim 1, wherein a switchover of the at least one semiconductor switch between the open and the closed state is performed by at least one comparator circuit cooperating with the at least one semiconductor switch via which a self-holding function is implemented such that the relevant semiconductor switch is not switched back to the closed state after switching the relevant semiconductor to the open state as a result of the accompanying electrical interruption of the supply line until the external electrical voltage is applied to the at least one electrical consumer.

3. The method according to claim 2, wherein, in response to detection by the at least one comparator circuit that the total electrical voltage present at the at least one semiconductor switch exceeds a predefined voltage threshold value, the at least one comparator circuit generates an output signal which triggers switching of the at least one semiconductor switch from the closed state to the open state to interrupt the electrical supply line.

4. The method according to claim 1, wherein at least one temperature sensor is electrically connected on an input side to the at least one comparator circuit such that, in response to the temperature determined with the at least one temperature sensor exceeding a predetermined threshold temperature, the at least one comparator circuit generates an output signal which triggers a switching of the at least one semiconductor switch from the closed state to the open state such that the electrical supply line is interrupted.

5. The method according to claim 2, wherein, in response to the at least one comparator circuit detecting that the external electrical voltage is applied to the at least one electrical consumer, the at least one comparator circuit generates an output signal which triggers a switching of the at least one semiconductor switch from the open state to the closed state.

6. The method according to claim 1, wherein at least one temperature sensor is electrically connected to the first electrical comparator input connection or to the second electrical comparator input connection.

7. The method according to claim 1, wherein the external electrical voltage is applied by connecting, in parallel, an electrical charging device to the at least one electrical consumer.

8. The method according to claim 2, wherein the switching of the at least one semiconductor switch between the open and the closed state is performed using a logic unit which generates an output signal through an "or link" or through an "and link" of two signal inputs with which the semiconductor switch is triggered, and wherein a first input signal generated at a first signal input of at least one logic unit is generated by the at least one comparator circuit.

9. The method according to claim 2, wherein the electrical current flowing through the electrical supply line is monitored with an additional electrical voltage monitor which switches at least one of the at least two semiconductor switches to the open state in response to the electrical current flowing through the electrical supply line exceeding a predetermined threshold value.

10. The method according to claim 9, wherein the electrical voltage monitor generates a control signal at a second signal input of the logic unit in response to the current threshold value being exceeded.

11. The method according to claim 9, wherein the switching of the at least one semiconductor switch to the open state by the at least one comparator circuit is held in the open state after the electrical current flowing through the electrical supply line has fallen below the current threshold value again.

12. An electronic circuit arrangement for electrical current limiting in a potentially explosive area, the electronic circuit arrangement comprising:
at least one electrical consumer configured to be supplied with energy from an electrical battery via an electrical supply line;
a first semiconductor switch and at least one second semiconductor switch, which are both arranged in the electrical supply line such that, by switching at least one semiconductor switch to an open state, the electrical supply line is electrically interrupted so that no electrical energy is transported via the electrical supply line from the electrical battery to the at least one electrical consumer;
an electrical supply connection to which the electrical battery is connectable or is connected, wherein the at least two semiconductor switches are arranged between the electrical supply connection and the at least one electrical consumer; and
at least one comparator circuit configured to:
switch at least one of the semiconductor switches to an open state to interrupt the electrical supply line in response to the total electrical voltage present at the semiconductor switches exceeding a predefined voltage threshold value; and
subsequently switch the at least one of the semiconductor switches from the open to the closed state again in response to an external electrical voltage being applied to the at least one electrical consumer,
wherein for switching from the open into the closed state the electrical voltage applied to the at least one electrical consumer must be larger than the electrical supply voltage provided by the electrical voltage source,
wherein:
a first electrical input voltage, which depends on a sum of an electrical voltage present at the at least one electrical consumer and an electrical voltage present at the semiconductor switches, is provided at a first comparator input connection of at least one comparator circuit;
a second electrical input voltage, which depends on the electrical voltage present at the at least one electrical consumer, is provided at a second comparator input connection of the at least one comparator circuit; and
depending on the electrical voltages provided at the first and second comparator input connections, an electrical output signal for controlling and optionally switching the semiconductor switch is generated at a comparator output connection of the at least one comparator circuit.

13. The electronic circuit arrangement according to claim 12, further comprising a logic unit which generates an output signal through an "or link" or through an "and link" of at least two signal inputs with which the semiconductor switch is triggered to switch the at least one of the first and second semiconductor switches between the open and the closed state,
wherein at least one of the at least two signal inputs is connected electrically to a comparator output of a comparator circuit assigned to the logic unit.

14. The electronic circuit arrangement according to claim 12, further comprising an additional electrical voltage monitor arranged in the electrical supply line and configured such that it switches at least one of the at least two semiconductor switches to the open state in response to the electrical current flowing through the electrical supply line exceeding a predetermined current threshold value.

15. The electronic circuit arrangement according to claim 14, wherein the electrical voltage monitor for switching the semiconductor switch to the open state in response to the current threshold value being exceeded at the second signal input of the logic unit and for generating the second input signal is connected electrically to a second signal input of the logic unit.

16. The electronic circuit arrangement according to claim 12, wherein on the input side, at least one temperature sensor is connected electrically to the first or second comparator input connection such that the at least one comparator circuit generates an electrical output signal which triggers switching of the at least one semiconductor switch from the closed state to the open state such that the electrical supply line is interrupted in response to the temperature measured with the at least one temperature sensor exceeding a predetermined temperature threshold value.

17. The electronic circuit arrangement according to claim 12, wherein the at least one comparator circuit includes an operational amplifier that includes the two comparator input connections and the comparator output connection.

18. The electronic circuit arrangement according to claim 12, wherein:
- the first comparator input connection is connected electrically via a first electrical voltage divider, to a first branch-off point, which is arranged in the electrical supply line between the electrical supply connection and the at least two semiconductor switches; and
- the second comparator input connection is connected electrically via a second electrical voltage divider to a second branch-off point, which is arranged in the electrical supply line between the at least two semiconductor switches and the at least one electrical consumer.

19. The electronic circuit arrangement according to claim 12, wherein in the electronic circuit arrangement, for each of the semiconductor switches configured to interrupt the electrical supply line, includes a logic unit for controlling this semiconductor switch and a comparator circuit for controlling the respective logic unit.

20. The electronic circuit arrangement according to claim 12, wherein the comparator output connection of at least one comparator circuit for triggering at least two different semiconductor switches arranged in the electrical supply line is connected electrically to the two signal inputs of at least two different logic units to trigger the semiconductor switches.

21. The electronic circuit arrangement according to claim 15, wherein at least one of the first electrical voltage divider and the second voltage divider includes at least one Ohmic electrical resistance configured as an NTC or PTC resistance.

22. The electronic circuit arrangement according to claim 12, wherein, during operation of the circuit arrangement, the switching of the at least one semiconductor switch between the open and the closed state is performed with the comparator circuit cooperating with the relevant semiconductor switch with which a self-holding function is implemented such that, after switching to the open state, the semiconductor switch is not instantaneously switched back to the closed state again, as a result of the accompanying electrical interruption in the supply line.

23. The electronic circuit arrangement according to claim 12, wherein, during operation of the circuit arrangement, in response to the comparator circuit detecting that the total electrical voltage present at the semiconductor switches exceeds a predefined voltage threshold value, the comparator circuit generates an output signal to trigger switching of the at least one semiconductor switch from the closed state to the open state such that the electrical supply line is interrupted.

24. The electronic circuit arrangement according to claim 12, further comprising, on the input side, at least one temperature sensor connected electrically to the comparator circuit such that, during operation of the circuit arrangement, the comparator circuit generates an output signal in response to the at least one temperature sensor determining that a threshold temperature has been exceeded, wherein the output signal triggers switching of at least one semiconductor switch from the closed to the open state so that the electrical supply line is interrupted.

25. The electronic circuit arrangement according to claim 12, wherein, during operation of the circuit arrangement, the at least one comparator circuit generates an output signal in response to the at least one comparator circuit detecting that the external electrical voltage is applied to the at least one electrical consumer, wherein the output signal triggers switching of the semiconductor switch from the open to the closed state.

* * * * *